C. B. HEATH.
RESILIENT TIRE.
APPLICATION FILED MAY 12, 1916.
1,206,325.
Patented Nov. 28, 1916.
2 SHEETS—SHEET 1.
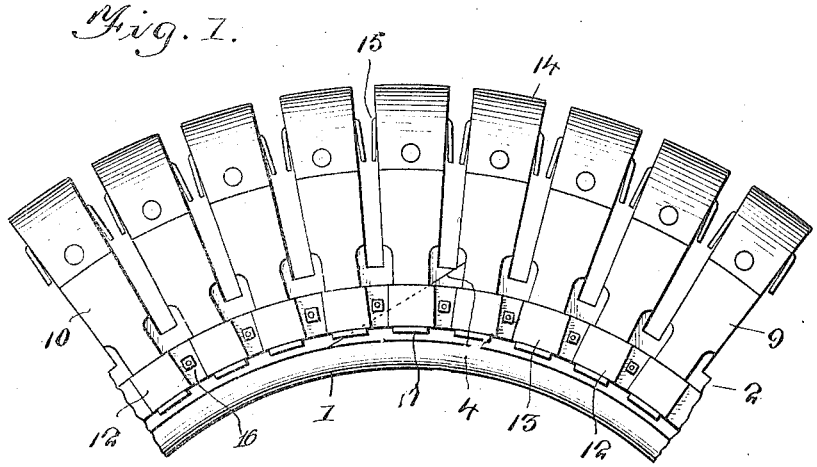
Witnesses
E. P. Ruppert
P. M. Smith
Inventor
C. B. Heath
By Victor J. Evans
Attorney

UNITED STATES PATENT OFFICE.

CLYDE B. HEATH, OF BROOKSBURG, INDIANA.

RESILIENT TIRE.

1,206,325.

Specification of Letters Patent. Patented Nov. 28, 1916.

Application filed May 12, 1916. Serial No. 97,125.

*To all whom it may concern:*

Be it known that I, CLYDE B. HEATH, a citizen of the United States, residing at Brooksburg, in the county of Jefferson and State of Indiana, have invented new and useful Improvements in Resilient Tires, of which the following is a specification.

This invention relates to resilient tires, the broad object in view being to do away with pneumatic tires in motor propelled vehicles and the incidental troubles such as punctures and blow outs and to substitute therefore a resilient tire which has practically the same action as a pneumatic tire and which involves a novel combination and arrangement of elements to produce the result referred to and which will enable those portions of the tire which are subjected to the greatest wear to be replaced from time to time as may be found necessary.

Figure 4:
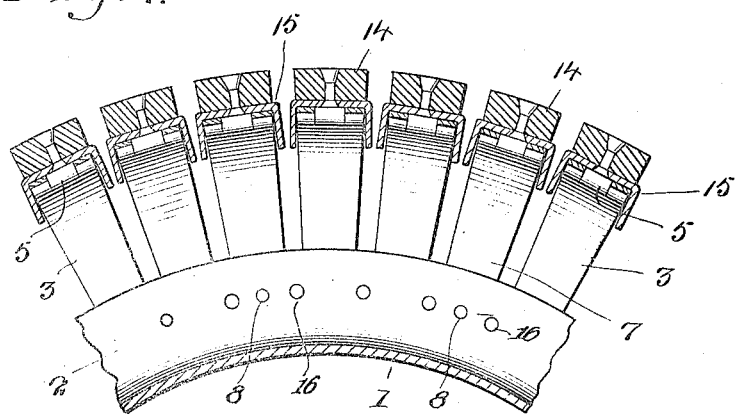
Figure 5:
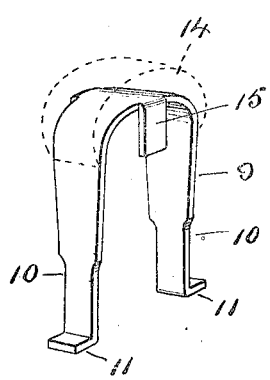
Figure 6:
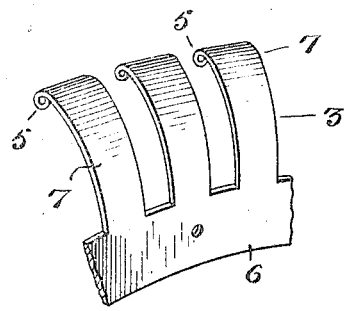

With the above and other objects in view, the invention consists in the novel construction, combination and arrangement of parts, as herein described, illustrated and claimed.
In the accompanying drawings:—Figure 1 is a fragmentary side elevation of a tire embodying the present invention. Fig. 2 is a fragmentary plan view of the same. Fig. 3 is a cross section through the tire. Fig. 4 is a fragmentary longitudinal section through the tire. Fig. 5 is a detail perspective view of one of the resilient tread carriers. Fig. 6 is a fragmentary perspective view of one of the resilient tread supporting members.

The tire contemplated in this invention comprises in the preferred embodiment thereof a base member 1 of channeled construction as clearly shown in the drawings, said base member being substantially U-shaped in cross section so as to provide oppositely arranged and substantially parallel and concentric flanges 2. Connected directly to the flanges 2 of the base member 1 are resilient tread supporting members 3 each of which is of annular formation and of sectional construction or, in other words, split or divided along oblique lines at one or more points in the length thereof as indicated by the dividing line 4 in Fig. 1, the several sections being overlapped and riveted or otherwise securely fastened together to form a complete annular member. Two of such members are employed as shown in the drawings and are connected together by a hinge joint 5 where they bear against and support the resilient tread carriers hereinafter described.

Each of the resilient tread supporting members 3 is formed as shown in Fig. 6 with an annular inner portion 6 and outwardly extending resilient or spring portions 7 arranged in spaced relation to each other and forming spring tongues which are connected together in pairs by the pins or joints 5 so that each pair of spring tongues may yield independently of the others. The annular portions 6 of the resilient tread supporting members 3 are fastened to the flanges 2 of the base member 1 by bolts or rivets 8.

In connection with each pair of spring tongues 7 I employ a resilient tread carrier 9 which is substantially U-shaped or arcuate in cross section and formed with inwardly extending arms 10 provided at their inner extremities with retaining lips 11 which are slidingly received in the looped portions 12 of annular retaining rings 13 fastened to opposite sides of the tire and arranged exteriorly thereof. Each of the tread carriers has secured to the outer face thereof a tread member 14 of rubber or any suitable resilient material, the same being riveted or otherwise fastened to the tread portion of the respective carrier 9. At its highest portion each tread carrier 9 is provided with inwardly extending positioning lips 15 which bear against the opposite edges of the respective tread supporting spring tongues 7 and against the opposite ends of the hinge pin at the joint 5.

From the foregoing description, taken in connection with the accompanying drawings it will now be seen that no compressed air is employed for holding the tire in its expanded or useful position, that the tire as a whole is inexpensive to manufacture and the life and durability thereof is much greater than the ordinary pneumatic tire. Furthermore, parts of the tire of this invention which become injured or broken may be easily replaced by new parts. The element which is subjected to the greatest wear is the tread member 14 and it will be apparent that new tread members may be applied to the tread carriers as frequently as may be found necessary.

The tire as a whole is adapted to be used on any wheel rim which is adapted to receive and hold a pneumatic or other tire.

It will be observed that the tread sections and their supporting means operate independently of each other and that as weight is brought to bear upon any tread member, the spring tongues supporting the same yield outwardly or laterally and conform to the shape of the inner surface of the resilient tread supporting member, while the arms 10 slide within the looped portions of the keeper rings. This produces a tire of great resiliency. The keeper rings are preferably secured in place by stud bolts 16 projecting outwardly from the flanges 2 through the annular portions 6 of the tread supporting members, nuts being placed upon said bolts at the outer sides of said keeper rings in order that the latter may be removed with facility in order to remove the tread carriers for repair or renewal purposes.

I claim:—

1. A resilient tire comprising a base member of annular formation, resilient tread supporting means embodying annular members having a fixed relation to the base member and each formed with a circular series of spring tongues arranged in spaced relation to each other, the tongues of said members being arranged in pairs and being curved toward each other and connected at their outer extremities by a hinge pin, and a resilient tread carrier for each pair of spring tongues, said tread carrier being supported by said spring tongues, and means for preventing displacement of the tread carrier in relation to said tongues.

2. A resilient tire comprising a base member of annular formation, resilient tread supporting means embodying annular members having a fixed relation to the base member and each formed with a circular series of spring tongues arranged in spaced relation to each other, the tongues of said members being arranged in pairs and being curved toward each other and connected at their outer extremities by a hinge pin, a resilient tread carrier for each pair of spring tongues, said tread carrier being supported by said spring tongues, means for preventing displacement of the tread carrier in relation to said tongues, said means comprising arms extending inwardly from each tread carrier, and arm retaining means in connection with which said arms are slidable radially with respect to the center of the wheel.

3. A resilient tire comprising a base member of annular formation, resilient tread supporting means embodying annular members having a fixed relation to the base member and each formed with a circular series of spring tongues arranged in spaced relation to each other, the tongues of said members being arranged in pairs and being curved toward each other and connected at their outer extremities by a hinge pin, a resilient tread carrier for each pair of spring tongues, said tread carrier being supported by said spring tongues, means for preventing displacement of the tread carrier in relation to said tongues, said means comprising arms extending inwardly from each tread carrier, arm retaining means in connection with which said arms are slidable radially with respect to the center of the wheel, and positioning lips extending inwardly from the central portion of the tread carrier and straddling the corresponding portions of said spring tongues.

4. A resilient tire comprising a base member of annular formation, resilient tread supporting means embodying annular members having a fixed relation to the base member and each formed with a circular series of spring tongues arranged in spaced relation to each other, the tongues of said members being arranged in pairs and being curved toward each other and connected at their outer extremities by a hinge pin, a resilient tread carrier for each pair of spring tongues, said tread carrier being supported by said spring tongues, means for preventing displacement of the tread carrier in relation to said tongues, said means comprising arms extending inwardly from each tread carrier, and arm retaining means in connection with which said arms are slidable radially with respect to the center of the wheel, said arm retaining means consisting of keeper rings fastened to the base member and having looped portions through which said arms are slidable.

In testimony whereof I affix my signature.

CLYDE B. HEATH.

Witnesses:
P. E. BEER,
FLORENCE ROCH.